C. D. RIGGLE.
CLOTHES LINE REEL.
APPLICATION FILED APR. 24, 1911.
1,015,459.
Patented Jan. 23, 1912.
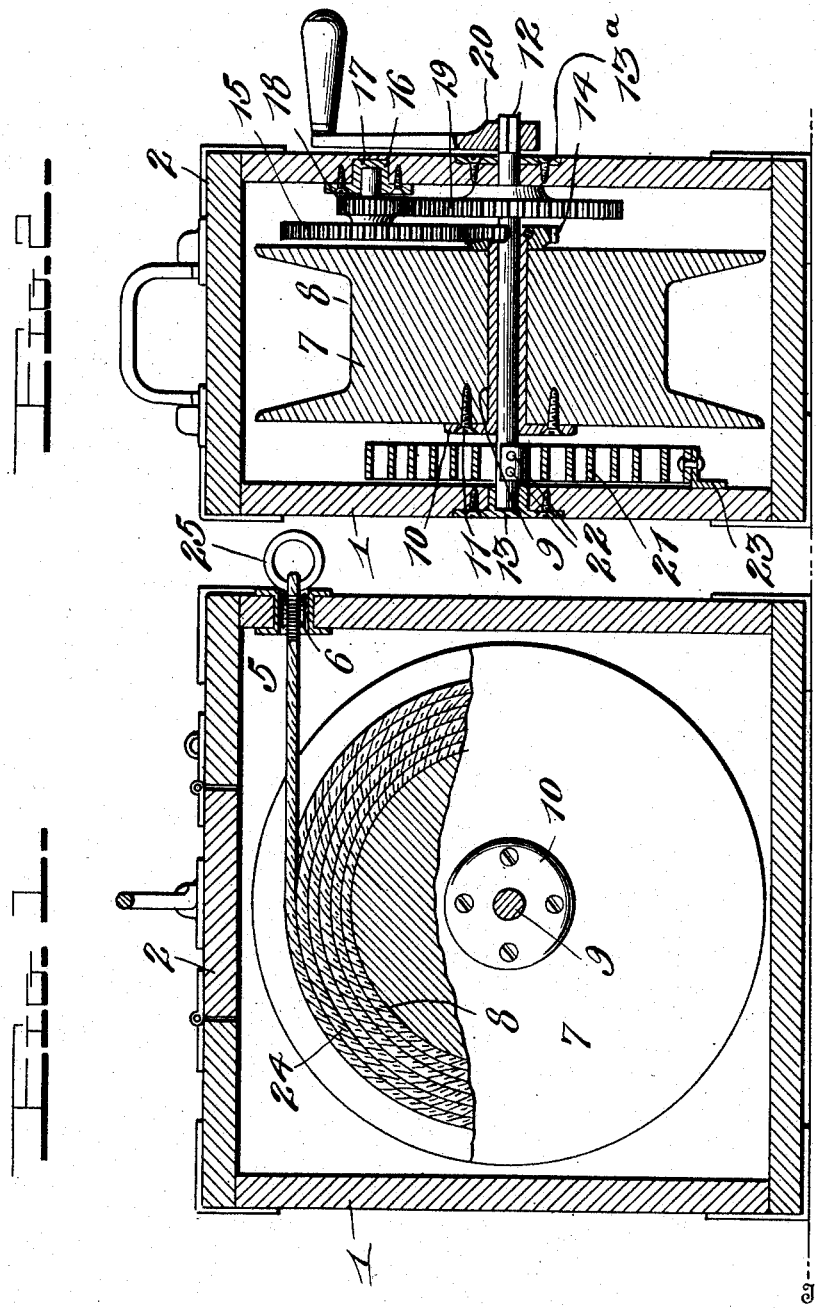
Witnesses
Chas. L. Griestauer.
L. G. Ellis.
Inventor
C. D. Riggle,
By Watson E. Coleman.
Attorney

UNITED STATES PATENT OFFICE.

CHARLES DELOS RIGGLE, OF McKEESPORT, PENNSYLVANIA.

CLOTHES-LINE REEL.

1,015,459.  Specification of Letters Patent.  Patented Jan. 23, 1912.

Application filed April 24, 1911. Serial No. 623,011.

*To all whom it may concern:*

Be it known that I, CHARLES D. RIGGLE, a citizen of the United States, residing at McKeesport, in the county of Allegheny and State of Pennsylvania, have invented certain new and useful Improvements in Clothes-Line Reels, of which the following is a specification, reference being had to the accompanying drawings.

This invention is an improved clothes line reel and consists in the construction, combination and arrangement of devices hereinafter described and claimed.

The object of my invention is to provide an improved clothes line reel which includes a drum on which the line is wound, a spring for turning the drum to cause the latter to wind up the line when the line is not in use and gears for operating the drum so as to wind up the spring when attaching the clothes line to the drum.

In the accompanying drawings Figure 1 is a vertical sectional view of a clothes line reel constructed in accordance with my invention, the drum being also shown partly in section; and Fig. 2 is a vertical transverse sectional view of the same.

In accordance with my invention I provide a box or casing 1 which may be of any suitable size and shape and is adapted, in practice, to be attached to any suitable supporting object such as a wall, a post or other structure. In the form of the invention here shown the box or casing is provided in the top with a hinged lid 2. In one end of the box or casing is an opening lined by a thimble 5, sheaves 6 being mounted in the thimble at the ends thereof.

The drum 7 is provided with a peripheral channel 8 for the reception of the clothes line. A sleeve 9 extends through the center of the drum and is provided at one end with a head 10 which bears against one side of the drum and is secured thereto by screws 11. A shaft 12 extends through the sleeve and enables the sleeve and the drum to rotate on the shaft. One end of the shaft is mounted in a bearing 13 in one side of the box or casing. The other end of the shaft projects through the opposite side of the box or casing and is mounted in a bearing 13ª. The outer end of the shaft is angular in form, cross sectionally, and may be engaged by a crank 20. This crank is detachable from the shaft and is only employed when a new line is to be attached to the drum. A spur gear 14 is fast to one end of the sleeve and, hence, rotates with the drum. This spur gear is engaged by a larger gear 15 which revolves on a stub shaft 16 which has, at its inner end, a base 17 which is secured to the inner side of one wall of the box or casing. A smaller gear 18 is fast to and revolves with the gear 15. The gear 18 is engaged by a larger gear 19 which is fast to the shaft 12. A coil spring 21 has its inner end attached to the shaft 12 as at 22 and its outer end secured, as by means of a bracket 23, to one side of the box or casing. This coil spring, as will be understood, turns the drum in one direction. The line is coiled on the drum in the reverse direction so that when the line is drawn out the spring is wound and when the line is released the spring rotates the drum so as to coil up the line. Owing to the provision of the gears hereinbefore described which connect the drum to the shaft the spring turns the drum at a higher rate of speed than the shaft, as will be understood. Before attaching a line to the drum the spring can be wound up by first fitting the crank 20 to the shaft 12 and then turning the said crank in the required direction. The crank is ordinarily disengaged from the shaft.

The clothes line, indicated at 24, passes through the thimble in one end of the box or casing, and after the spring has been wound up, is attached to the drum. The action of the spring then revolves the drum so as to cause the latter to wind up the line. Hence, the line is normally wound on the drum but it may be drawn out from the box or casing at any time for use, and as soon as the line is released, after being used, the spring and drum then co-act to rewind the line. Hence the line is kept in the box or casing and protected thereby from the weather and is prevented from rotting and the life of the line is thereby greatly prolonged. Moreover, the spring and drum act automatically to wind up the line as soon as the line is released and thus greatly facilitate the use of the line. The line is preferably provided at its free end with a suitable eye 25 which, when the line is released, prevents the free end thereof from slipping through the thimble.

While I have herein shown and described what I now consider a preferred embodiment of my invention I would have it understood that changes may be made in the form and construction of the several parts without departing from the spirit of my invention and within the scope of the appended claim.

Having thus described my invention I claim:

The herein described clothes line reel comprising a box or casing having an opening in one side thereof, a shaft mounted in bearings in opposite sides of the casing and provided with a crank at one end whereby it may be turned, a coil spring having one end connected to the shaft and one end secured to one side of the casing, a gear fast on said shaft, a sleeve mounted for rotation on the shaft and having a pinion secured thereto at one end, a drum mounted on and revoluble with the sleeve, a stub shaft secured to one side of the casing, a gear mounted on said stub shaft engaging the pinion of the sleeve, and a smaller gear also mounted on the stub shaft, revoluble with the last named gear and engaged by the gear on the first named shaft.

In testimony whereof I hereunto affix my signature in the presence of two witnesses.

CHARLES DELOS RIGGLE.

Witnesses:
  WILLIAM ILEY,
  GEORGE HABERMAN.